United States Patent
Liu et al.

(10) Patent No.: US 8,958,359 B2
(45) Date of Patent: *Feb. 17, 2015

(54) HYBRID AUTOMATIC REPEAT REQUEST METHOD OF A DOWNLINK TUNNEL

(75) Inventors: Yang Liu, Shenzhen (CN); Hongyun Qu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 266 days.

This patent is subject to a terminal disclaimer.

(21) Appl. No.: 13/474,807

(22) Filed: May 18, 2012

(65) Prior Publication Data

US 2012/0236781 A1 Sep. 20, 2012

Related U.S. Application Data

(63) Continuation of application No. 12/734,164, filed as application No. PCT/CN2007/000328 on Nov. 20, 2007, now Pat. No. 8,208,420.

(30) Foreign Application Priority Data

Nov. 5, 2007 (CN) .......................... 2007 1 0165178

(51) Int. Cl.
*H04J 1/10* (2006.01)
*H04L 1/18* (2006.01)
*H04L 1/00* (2006.01)

(52) U.S. Cl.
CPC ............. *H04L 1/1887* (2013.01); *H04L 1/1812* (2013.01); *H04L 2001/0097* (2013.01)
USPC ........................................ 370/315; 370/469

(58) Field of Classification Search
USPC ................................................ 370/315, 469
See application file for complete search history.

(56) References Cited

U.S. PATENT DOCUMENTS 6,873,627 B1 3/2005 Miller et al.
8,208,420 B2 * 6/2012 Liu et al. ...................... 370/315

(Continued)

FOREIGN PATENT DOCUMENTS

| CN | 1984072 A | 6/2007 |
|---|---|---|
| CN | 101047481 A | 10/2007 |
| GB | 2436912 A1 | 10/2007 |
| KR | 20020037565 A | 5/2002 |
| WO | 2006024320 A1 | 3/2006 |
| WO | 2007083219 A2 | 7/2007 |

OTHER PUBLICATIONS

International Search Report in international application No. PCT/CN2007/003287, mailed on Aug. 21, 2008. (2 pages—see entire document).

(Continued)

*Primary Examiner* — Phuc Tran
(74) *Attorney, Agent, or Firm* — Oppedahl Patent Law Firm LLC

(57) ABSTRACT

The invention discloses a hybrid automatic repeat request method of a downlink tunnel connection in a multi-hop relay system. The base station transmits tunnel data, comprising of protocol data, to the access relay station via the tunnel link, and receives feedback until the access relay station receives the data correctly. The access relay station analyzes the protocol data unit of each mobile station, transmits the protocol data to the corresponding mobile station, and performs the corresponding process after receiving feedback from each mobile station. Each hop relay station, except for the station accessing the mobile station, will not transmit the reception acknowledgment information to the base station immediately. The corresponding processing after the access relay station receives the feedback is transmitting the feedback from the mobile station to the base station or, not transmitting the feedback, but applying for bandwidth for retransmission according to the feedback of the mobile station.

28 Claims, 14 Drawing Sheets

(56) References Cited

U.S. PATENT DOCUMENTS

2005/0100016 A1  5/2005  Miller et al.
2006/0172738 A1  8/2006  Kwon et al.
2007/0025301 A1  2/2007  Petersson et al.
2007/0124642 A1  5/2007  Suh et al.
2007/0190933 A1  8/2007  Zheng et al.
2008/0025182 A1  1/2008  Seo et al.
2008/0317017 A1  12/2008  Wiemann et al.
2010/0202454 A1  8/2010  Miller et al.
2011/0038376 A1  2/2011  Wiemann et al.

OTHER PUBLICATIONS

English Translation of the Written Opinion of the International Search Authority in international application No. PCT/CN2007/003287, mailed on Aug. 21, 2008. (3 pages—see entire document).
Supplementary European Search Report in European Application No. 07816885.3, mailed on Mar. 4, 2013. (8 pages—see entire document).
Haihong Zheng et al: "HARQ with Relays", IEEE 802.16 Broadband Wireless Access Working Group, IEEE C802.16J-06/197R, vol. C802.16J-06/197R, Nov. 7, 2006, pp. 1-9.

\* cited by examiner

Fig. 8

| Number of hops | Feedback symbol | Value of Tile | Code |
|---|---|---|---|
| any hop | 0(ACK) | 0,0,0 | D0 |
| 1 | 1(NAK) | 1,1,1 | D1 |
| 2 | 2(NAK) | 2,2,2 | D2 |
| 3 | 3(NAK) | 3,3,3 | D3 |
| 4 | 4(NAK) | 4,4,4 | D4 |
| 5 | 5(NAK) | 5,5,5 | D5 |
| 6 | 6(NAK) | 6,6,6 | D6 |
| 7 | 7(NAK) | 7,7,7 | D7 |

Fig. 9

| Connection identifier | Value | Description |
|---|---|---|
| Tunnel CID used in tunnel packet mode | 2m+1-k | used by MR-BS or RS for tunnel transmission connections in tunnel packet mode |
| Tunnel CID used in tunnel burst mode | k-n | used by MR-BS or RS for tunnel transmission connections in tunnel burst mode |

Fig. 10

| Code | Feedback symbol | Value of Tile |
|---|---|---|
| A0 | 000 | 0,0,0 |
| A1 | 001 | 4,7,2 |
| A2 | 010 | 3,5,1 |
| A3 | 011 | 7,2,4 |
| A4 | 100 | 5,1,3 |
| A5 | 101 | 6,2,3 |
| A6 | 110 | 5,1,7 |
| A7 | 111 | 2,6,5 |

Fig. 11

| Grammar | Size | Label |
|---|---|---|
| relay HARQ downlink MAP IE (){ | - | - |
| ... | ... | ... |
| mode | 4 bits | ... 0b0111 = downlink HARQ empty burst IE 0b1000-0b111 reserved |
| ... | ... | ... |
| if(mode == 0b0000){ | - | - |
| ... | ... | ... |
| } else if (mode == 0b0111){ | - | - |
| downlink HARQ empty burst IE | variable | - |
| } | - | - |
| ... | ... | ... |
| } | - | - |

Fig. 12

| Grammar | Size | Label |
|---|---|---|
| downlink HARQ empty burst IE (){ | - | - |
| N | 4 bits | the number of empty bursts in current frame |
| if (j=0; j<the number of dummy sub- bursts; j++){ | - | - |
| RCID_IE() | variable | - |
| ACID | 4 bits | feedback channel identifier |
| } | - | - |

Fig. 13

| Grammar | Size | Label |
|---|---|---|
| relay HARQ downlink MAP IE (){ | - | - |
| ... | ... | ... |
| mode | 4 bits | ... 0b0111 = feedback delay notice IE 0b1000-0b111 reserved |
| ... | ... | ... |
| if (mode == 0b0000){ | - | - |
| ... | ... | ... |
| } else if (mode == 0b0111){ | - | - |
| feedback delay notice IE | variable | - |
| } | - | - |
| ... | ... | ... |
| } | - | - |

Fig. 14

| Grammar | Size | Label |
|---|---|---|
| feedback delay notice IE (){ | - | - |
| N | 4 bits | the number of connections that need to be notified |
| if (j=0; j<N; j++){ | - | - |
| RCID_IE() | variable | - |
| ACID | 4 bits | feedback channel identifier |
| feedback delay | 3 bits | unit: frame. |
| } | - | - |

HYBRID AUTOMATIC REPEAT REQUEST METHOD OF A DOWNLINK TUNNEL

This application is a continuation of U.S. application Ser. No. 12/734,164 filed Apr. 15, 2010, which application is incorporated herein by reference for all purposes.

TECHNICAL FIELD

The present invention relates generally to the field of communications, and relates more specifically to a hybrid automatic repeat request method of a downlink tunnel connection in a multi-hop relay system.

BACKGROUND

In order to enlarge the coverage of communication systems and to increase capacity of systems, one or more relay stations (Relay Station, shortened as RS) may be set between a multi-hop relay base station (Multi-hop Relay Base Station, shortened as MR-BS) and mobile stations (Mobile Stations, shortened as MS). Channel resource allocation must be implemented by an MR-BS in a centralized relay system, therefore the design of a hybrid automatic repeat request (Hybrid Automatic Repeat Request, shortened as HARQ) of the relay system that schedules a RS in a centralized manner is relatively complex.

The form of an HARQ will be increased accordingly due to the introduction of an RS, and the typical forms are an end-to-end HARQ and an hop-by-hop HARQ. With regard to the end-to-end HARQ of the centralized relay, an uplink control station has allocated a corresponding feedback channel for each RS to transfer an ACK/NACK before the RS transmits a certain HARQ burst (also called sub-burst). In existing technologies, the RS knows the feedback channel allocated to itself by calculation after receiving the burst which is to be transferred, and then transmits feedback over corresponding resource. Once the burst fails to be transferred by the relay, a delay for retransmission may also become large due to the long feedback time because air interface resource must be allocated by the MR-BS when centralized scheduling is adopted.

Moreover, as shown in FIG. 1, when one RS applies access to multiple MSs, one relay tunnel can be set up between the access RS and the MR-BS. Protocol data units (shortened as PDUs) of multiple MSs can make up one tunnel burst by the MR-BS to act as a basic unit of the HARQ to be transmitted in one frame. After the tunnel burst reaches the access RS successfully, the RS restores the PDUs of each MS, and continues to accomplish the HARQ on the access link.

Presently, in the IEEE802.16j standard draft, the tunnel data can be divided into two modes: a tunnel packet mode and a tunnel burst mode. In the tunnel packet mode, the PDU of each MS is assembled as one tunnel packet to be transmitted. The tunnel packet has its own packet header (including a Tunnel Connection Identifier (Tunnel CID, shortened as TCID)) and a Cyclic Redundancy Check (Cyclic Redundancy Check, shortened as CRC) code. One burst may have tunnel packets on different tunnels. In the tunnel burst mode, the TCID is provided in a downlink map information element (DL MAP IE), therefore the tunnel data may be taken as one burst of a physical layer. One burst can only include PDUs of MSs on the same tunnel. A reduced connection identifier (RCID) of each PDU is replaced by the same TCID.

However, an HARQ method completely involving tunnel data transmission is never prescribed in existing technologies. For example, an ACK of each MS cannot be transferred on a tunnel individually when a tunnel packet or a tunnel burst is used for transmission. The advantage of tunnel transmission may be lost if a TCID is not added to tunnel data while a data burst of each MS is fed back individually, because at this moment, it may seem that multiple MSs perform the HARQ independently.

SUMMARY

Whereas the above-mentioned one or more problems, the present invention provides a hybrid automatic repeat request method of a downlink tunnel.

According to embodiments of the present invention, the hybrid automatic repeat request method of a downlink tunnel comprises the following steps: a base station transmits tunnel data comprising protocol data units of multiple MSs to an access relay station via a tunnel link; the access relay station determines its own reception of the tunnel data comprising protocol data units of multiple MSs, and transmits feedback (reception acknowledgement information or repeat request information) to the base station via the tunnel link, or receives feedback from each MS about reception of a corresponding protocol data unit which is sent via an access link, then according to the feedback from each MS, applies for bandwidth for retransmission or concentratedly transmits the feedback from each MS to the base station via the tunnel link, wherein, the access relay station extracts the protocol data unit of each MS after successfully receiving the tunnel data comprising the protocol data units of multiple MSs, and transmits the protocol data unit of each MS to each MS via the access link. The tunnel link is made up of multi-hop relay stations, the relay station accessing the base station is the $1^{st}$ hop relay station, and the relay station accessing the MS is the $n^{th}$ hop relay station, wherein, the $1^{st}$ hop, the $2^{nd}$ hop, ..., the $(n-1)^{th}$ hop relay station will not transmit feedback immediately to the base station after receiving the tunnel data.

Wherein, the base station may allocate corresponding channels for data transmission and feedback to each hop relay station before transmitting the tunnel data. Each hop relay station may know the feedback channel which is allocated to it by the base station via its own calculation.

Wherein, when the $t^{th}$ hop relay station on the tunnel link fails to receive the tunnel data comprising protocol data units of multiple MSs, the $t^{th}$ hop relay station may transmit repeat request information to the base station via the $(t-1)^{th}$ hop, the $(t-2)^{th}$ hop, ..., the $1^{st}$ hop relay station over the feedback channel which is allocated to it by the base station.

If the tunnel end point (i.e., the access relay station) receives the tunnel data comprising protocol data units of multiple MSs successfully, the tunnel end point may feed back upwards reception acknowledgement information immediately. If the access relay station fails to receive the tunnel data comprising protocol data units of multiple MSs, then the access relay station may feed back upwards repeat request information immediately. The repeat request information may be encoded to inform the base station that in which hop a reception error of the tunnel data occurs.

If the $t^{th}$ relay station receives the tunnel data comprising protocol data units of multiple MSs in the $i^{th}$ frame correctly, the $t^{th}$ relay station may transfer feedback from a downlink relay station to the base station in the $(i+m)^{th}$ frame, wherein, $m=M*q+(M+1)*k$, M is the number of hops between the $t^{th}$ hop relay station and the tunnel end-point relay station, q is the number of fixed delay frames of each hop relay station for the tunnel data, k is a delay for hybrid automatic repeat request feedback for the tunnel data on each hop relay station. If the feedback received is reception acknowledgement information, the $t^{th}$ hop relay station transfers uplink without any change. If the feedback received is repeat request information, the $t^{th}$ hop relay station may, by encoding the repeat request information, inform the base station that in which hop a reception error of the tunnel data occurs.

If the $t^{th}$ hop relay station fails to receive the tunnel data comprising protocol data units of multiple MSs, the $t^{th}$ hop relay station may feed back upwards repeat request information over the feedback channel which is allocated to it by the base station. The repeat request information may be encoded to inform the base station that in which hop a reception error of the tunnel data occurs.

If the tunnel data comprising protocol data units of multiple MSs is a tunnel burst, the $t^{th}$ hop relay station that has received the tunnel burst may determine whether it receives the protocol data unit of each MS successfully according to a cyclic redundancy check code which is carried by the protocol data unit of each MS. The encoded repeat request information may include information with respect to the $t^{th}$ hop relay station and information with respect to connections of which protocol data units are not received successfully by the $t^{th}$ hop relay station.

If the tunnel data comprising protocol data units of multiple MSs is a tunnel packet, the $t^{th}$ hop relay station that has received the tunnel burst may determine whether it receives the tunnel data comprising protocol data units of multiple MSs successfully according to a cyclic redundancy check code of the tunnel data comprising protocol data units of multiple MSs. The encoded repeat request information may include information with respect to the $t^{th}$ hop relay station and information with respect to connections in the tunnel packet that are not received successfully.

If the access relay station receives the tunnel data comprising protocol data units of multiple MSs successfully, the access relay station may transmit the protocol data unit of each MS to each MS respectively.

Here, each MS may transmit the reception of the corresponding protocol data unit to the access relay station, i.e. suspending the hybrid automatic repeat request on the access link. The access relay station may retransmit the corresponding protocol data unit to the MS which fails to receive the corresponding protocol data unit via pre-scheduled air interface resource. In the event that the pre-scheduled air interface resource is insufficient for retransmitting the corresponding protocol data unit to the MS which fails to receive the corresponding protocol data unit, the access relay station may apply again to the base station for the air interface resource for retransmission.

Moreover, the access relay station may also report the reception of the protocol data units at multiple MSs upwards to the base station in a centralized report manner to complete the hybrid automatic repeat request on the access link. Here, the access relay station reports the reception of the protocol data units at multiple MSs upwards to the base station via the feedback channel which is pre-allocated by the base station. The access relay station may retransmit the corresponding protocol data unit to the MS which fails to receive the corresponding protocol data unit via pre-scheduled air interface resource. In the event that the pre-scheduled air interface resource is insufficient for retransmitting the corresponding protocol data unit to the MS which fails to receive the corresponding protocol data unit, the access relay station applies again to the base station for the air interface resource for retransmission.

According to the present invention, a hybrid automatic repeat request method including the tunnel data transmission can be perfected.

BRIEF DESCRIPTION OF THE DRAWINGS

The accompanying drawings illustrated here, which constitutes a part of this application paper, are used to provide further comprehension of the present invention, exemplary embodiments of the present invention together with the descriptions thereof serve to explain the present invention, but not constitute inappropriate limitations to the present invention. In the drawings:

FIG. 8 is a schematic diagram of an example of centralized feedback codes according to embodiments of the present invention;

FIG. 9 illustrates a classification of a CID of tunnel data according to embodiments of the present invention;

FIG. 10 is a schematic diagram of an example of tunnel packet feedback encoding according to embodiments of the present invention;

FIG. 11 is a schematic diagram defining an empty burst mode according to embodiments of the present invention;

FIG. 12 is a schematic diagram defining an empty burst format according to embodiments of the present invention;

FIG. 13 is a schematic diagram defining a feedback delay notice mode according to embodiments of the present invention; and FIG. 14 is a schematic diagram of a feedback delay notice format according to embodiments of the present invention.

DETAILED DESCRIPTION OF THE INVENTION

The embodiments of the present invention will be described below in detail with reference to the drawings.

Figure 1:
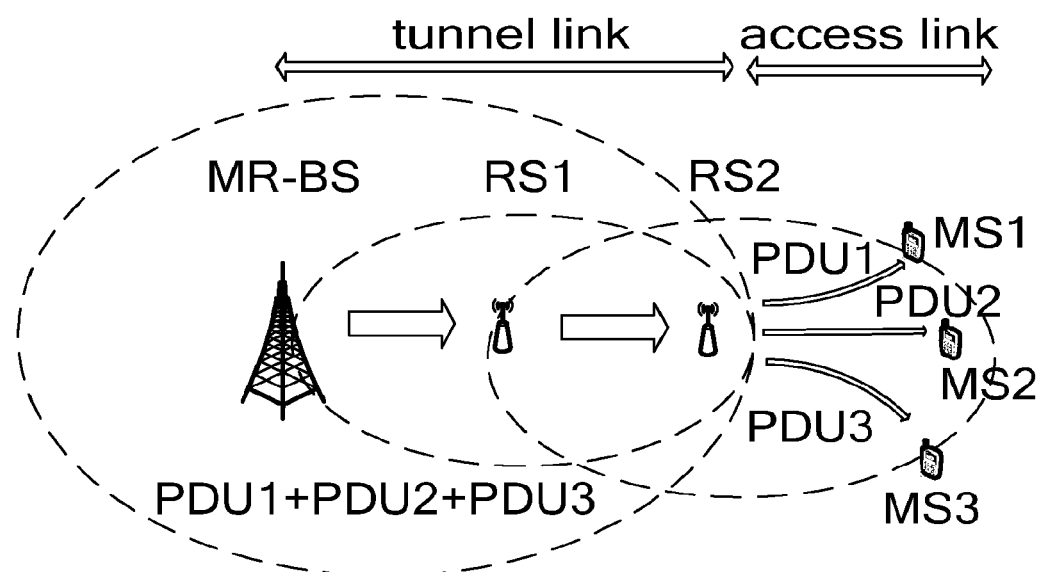
FIG. 1 is a schematic diagram of a configuration of a wireless relay network according to embodiments of the present invention.

Referring to FIG. 1, a configuration of a wireless relay network according to embodiments of the present invention is illustrated. As shown in FIG. 1, RS3 accesses multiple MSs, accordingly, one relay tunnel may be set up between the RS3 and a MR-BS. Protocol Data Units (PDU) of multiple MSs may make up one tunnel burst by the MR-BS to act as a basic unit of an HARQ to be transmitted in one frame. After the tunnel burst reaches the RS3 successfully, the RS3 restores the PDU of each MS, and continues to accomplish the HARQ accomplished on an access link.

Figure 2:
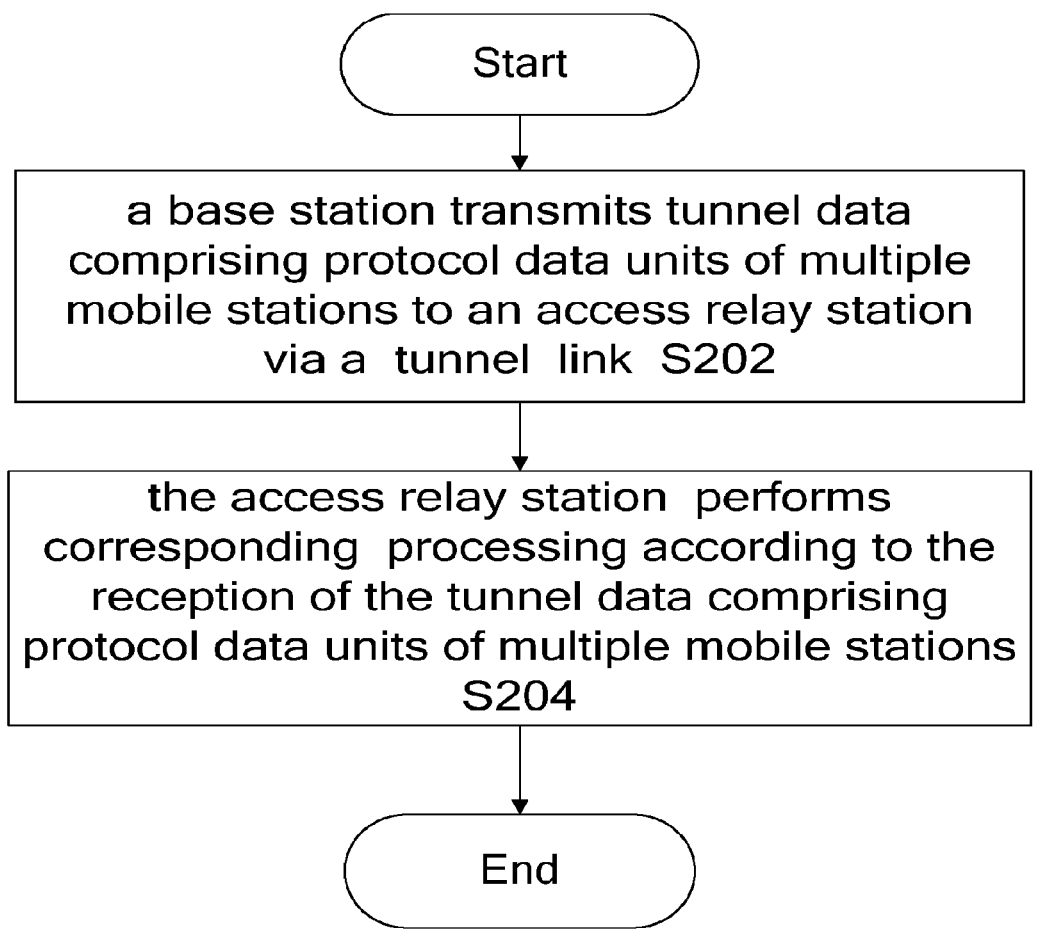
FIG. 2 is a flow chart of a hybrid automatic repeat request method of a downlink tunnel according to embodiments of the present invention.

Referring to FIG. 2, a hybrid automatic repeat request method of a downlink tunnel according to embodiments of the present invention is illustrated. The method includes the following steps: S202, a base station transmits tunnel data comprising protocol data units of multiple MSs to an access relay station via a tunnel link, and receives feedback from a relay station until the access relay station receives data correctly; S204, the access relay station extracts the protocol data unit of each MS from the tunnel data, transmits the protocol data unit of each MS to the corresponding MS, and performs corresponding processing after receiving feedback from each MS. Wherein, the tunnel link is made up of multi-hop relay stations, the relay station accessing the base station is the $1^{st}$ hop relay station, and the relay station accessing the MS is the $n^{th}$ hop relay station, wherein, the $1^{st}$ hop, the $2^{nd}$ hop, ..., the $(n-1)^{th}$ hop relay station will not transmit reception acknowledgement information to the base station immediately after receiving the tunnel data. Wherein, the corresponding processing is, after the access relay station receives the feedback from each MS, uplink relaying the feedback from the MSs to the base station or not uplink relaying the feedback but applying for bandwidth for retransmission according to the feedback from the MSs.

The processing of the above steps will be described hereinafter in detail.

Figure 3:
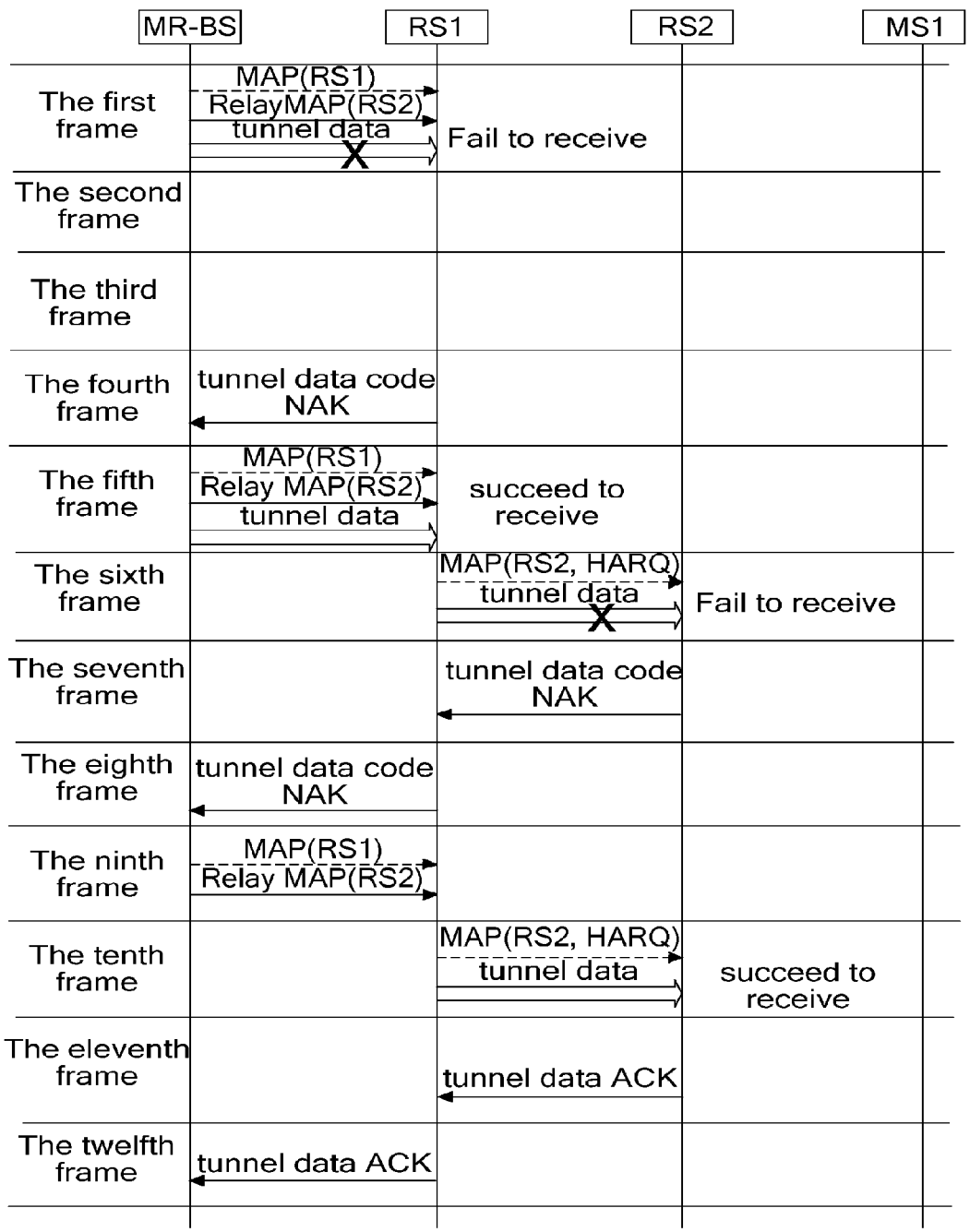
FIG. 3 is a schematic diagram of downlink tunnel data retransmission according to embodiments of the present invention.

In Step S202, as shown in FIG. 3, the RS is not required to provide feedback immediately after receiving the tunnel data, but continues to transfer the data. The MR-BS has allocated a corresponding feedback channel for each RS to transfer the feedback (tunnel data ACK/NAK) before the RS transmits certain tunnel data. Each RS may know the feedback channel allocated to itself by its own calculation, and transmits the feedback over corresponding resource. Here, the feedback from the RS3 is not received from the MS, but is generated locally from itself. There is no need to consider the access link in the calculation of the feedback time of all RSs.

The regulation for calculating a feedback delay for an end-to-end tunnel burst HARQ is provided by the following formula: $m = M*q + (M+1)*k$. Wherein, M is the number of hops between the RS and the tunnel end point; q is the number of fixed delay frames of the RS for the tunnel burst; k is the delay for the HARQ feedback for the tunnel burst defined by the system, which may be provided in system broadcast information depending on the situation.

Wherein, the specific implementation may use, but is not limited to the following method: adding the number of hops between each station and the tunnel end point to the field of the number of hops (hop depth) of the sub-burst information element (IE) of the tunnel data. Each station on the tunnel calculates the time for transferring the tunnel feedback by applying the value M to the above formula.

Moreover, if the RS does not transfer the tunnel burst successfully, it is necessary to feed back the failure over the pre-arranged feedback channel. The MR-BS restarts to schedule the next transfer. This step will end if and only if the tunnel data reaches the access RS successfully. Accordingly, it is necessary to define encoded feedback to denote different situations of the tunnel data transmission.

Figure 4:
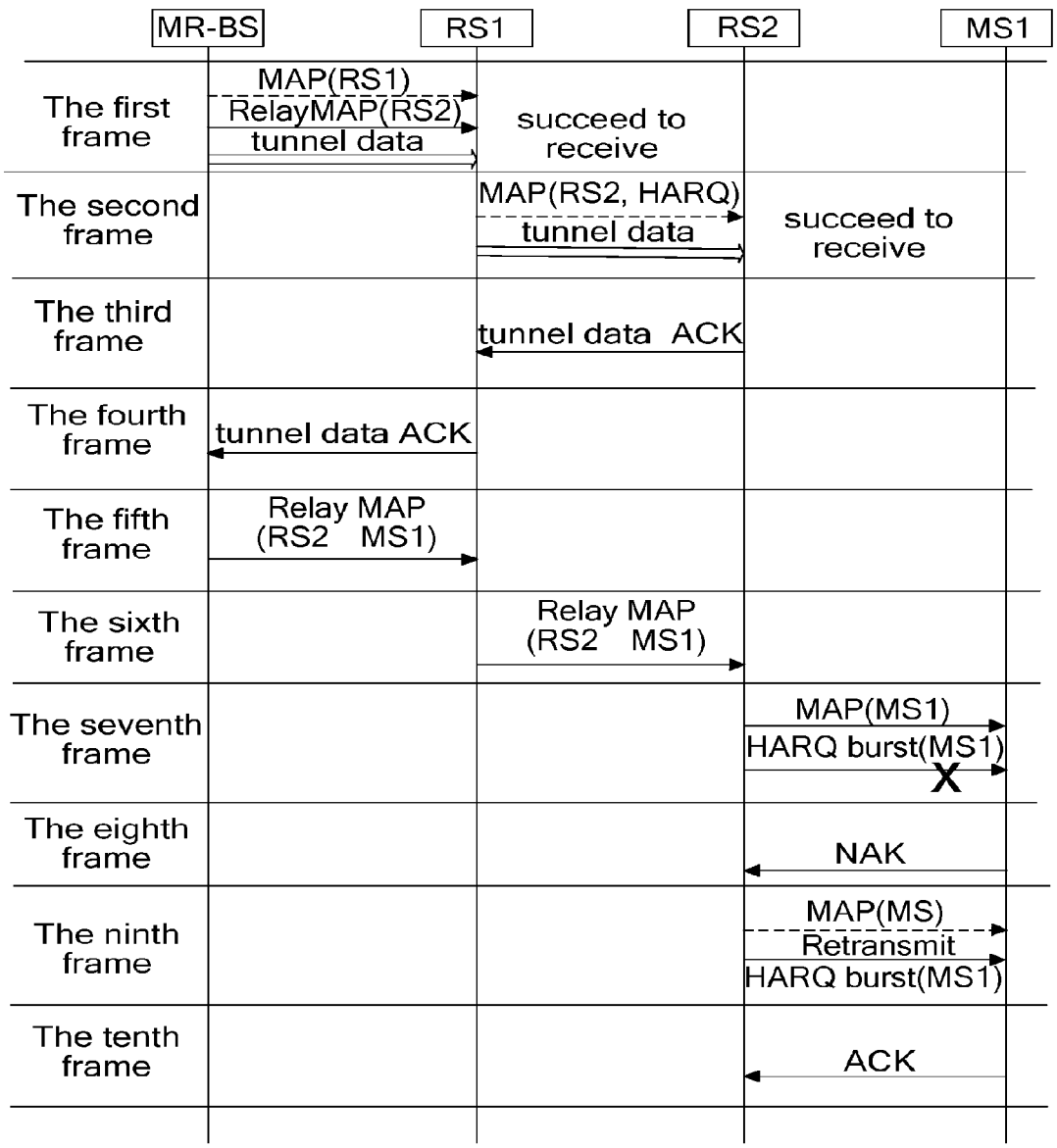
FIG. 4 is a schematic diagram of an HARQ on a link-by-link downlink tunnel adopting pre-scheduling on one access link according to embodiments of the present invention.

As shown in FIG. 4, when the tunnel data fails to be transmitted on the link, the encoded tunnel data NAK should be fed back to the MR-BS according to the pre-scheduling of the MR-BS. According to the codes, the MR-BS determines the RS that has failing transmission, and schedules corresponding resource to retransmit the failed tunnel data.

When the tunnel data is a tunnel packet, a CRC check code is added to the packet itself. The RS may determine whether the reception is successful according to the CRC check code of the packet. If the tunnel packet fails to be received, the entire tunnel packet may be retransmitted. The MR-BS is required to allocate only half a sub-channel for the tunnel packet feedback as a feedback channel, it is equivalent to take one tunnel packet as one ordinary sub-burst, the feedback channel is saved greatly, but the cost is that data channels for retransmission always occupy the tunnel packet size. The feedback on the NAK of the tunnel packet is only required to reflect that in which hop the failure occurs, and the corresponding codes may be shown as FIG. 8. The feedback code D0 indicates that the tunnel packet is transmitted successfully. Each relay transmits D0 to the MR-BS without any change after receiving D0. If the tunnel data fails to be transmitted in the $x^{th}$ hop, the start point of this hop, RSx, will transmit D1, RS(x−1) receiving D1 will add one to the code, and then transmits D2. Through cycling like this, the MR-BS may know that it is necessary to re-arrange resource to transmit the tunnel packet in the $x^{th}$ hop when receiving the feedback encoded as a Dx.

Furthermore, the MR-BS may also arrange a corresponding feedback channel for each connection in the tunnel packet. Here, the advantage of the tunnel packet is that if the tunnel burst is transmitted successfully, it may be checked out at one time that all PDUs are transmitted successfully by using the CRC carried by the packet itself, and then all the connections are required to feed back codes which represent success over their own feedback channels. Correspondingly, if the tunnel burst fails to be transmitted, the RS shall check out the connection that has an error transmission according to the CRC check code carried by each PDU itself, and then transmits feedback using codes in the existing 16j standard. After receiving the feedback code in the existing standard, the MR-BS will arrange retransmission of the tunnel packet according to the feedback. The retransmitted packet will only carry the PDU of the connection that had an error transmission last time. In this way, the feedback channel will be enlarged, but the overhead of the data transmission channel will be reduced.

When the tunnel data is a tunnel burst, the burst itself does not carry the CRC check code. The RS should determine respectively whether the PDU is received successfully according to the CRC check code carried by each PDU itself which constitutes the tunnel burst, and finally, determines whether the entire burst is received successfully. If the failure of receiving a part of PDUs leads to the failure of receiving the tunnel burst, it is only required to retransmit the corresponding PDU, therefore, the feedback code of the tunnel burst is required not only to reflect the hops in which the failure occurs, but also to reflect the PDU of the connection in which the failure occurs. Therefore, the feedback channel of the tunnel burst is actually the collection of feedback channels of all connections on the tunnel. Each sub-burst making up the burst may feed back its reception using the codes shown in FIG. 8. The RS collects the feedback from each sub-burst of the tunnel burst, and concentratedly transmits the feedback over the feedback channel which is allocated by the base station. The MR-BS will arrange retransmission of the tunnel burst according to the feedback after receiving the existing centralized feedback codes. The retransmitted burst will only carry the sub-burst corresponding to the PDU of the connection which had an error transmission last time.

Moreover, in the existing IEEE802.16j standard technology, each MS (distinguished by a RCID) can only carry 16 connections at most and accordingly has 16 sub-channels, therefore 4 bits may be used to constitute a feedback subchannel identifier (ACID). However, in the tunnel burst, RCIDs of different sub-bursts are replaced by the same TCID, the ACID of each MS may conflict at this moment, and moreover it can not be identified that which sub-burst has an error. Therefore, as shown in FIG. 9, the tunnel packet TCID and the tunnel burst TCID of bursts may be defined in section in the TCID definition. In this way, the tunnel packet mode and the tunnel burst mode can be distinguished by the TCID in transmission. In the tunnel packet mode, the ACID of the corresponding sub-burst is still 4 bits. In the tunnel burst mode, the ACID of the corresponding sub-burst is defined as 8 bits and is sorted again, in this way the conflict of the ACIDs can be avoided.

In Step S204, the access RS (the start point of the access link) has stored the burst on each access link, and the MR-BS should arrange the channels for burst retransmission and feedback on the access link.

The characteristic of the embodiment 1 is a link-by-link HARQ, the so-called link-by-link, as shown in FIG. 1, means that the tunnel HARQ is one link and each access link between the access RS at the tunnel end point and each MS is another link. The data is transmitted over transmission links which are made up of two links respectively in different combination formats. The transmission over the two links respectively adopts an end-to-end HARQ. In this way, new data may begin to be transmitted as long as the tunnel end point receives the tunnel data successfully. Compared to the case where the MR-BS can transmit new data only if it receives feedback from the MS, the efficiency of data transmission is obviously improved in the embodiment of the present invention.

In the embodiment 1, the feedback on the access link is only required to be transmitted to the access RS. However, if the burst transmission fails on the access link, the access RS must apply for bandwidth retransmission and give feedback to the MR-BS. In order to improve the retransmission efficiency of the access link, it may be considered to adopt pre-scheduling on the access link.

As shown in FIG. 4, the MR-BS may pre-schedule appropriate air interface resource for retransmission on the access link according to link information of the access link. In case the MS reports to the uplink RS3 that a burst fails to be received on the access link, the RS3 may begin to retransmit the failed burst immediately on the pre-scheduled air interface resource, without waiting the MR-BS to arrange new air interface resource. The pre-scheduled resource (i.e., pre-scheduling the number of times of retransmission as well as sub-channels for retransmission) may be adjusted according to channel information reported upwards by the access link.

If all bursts on the access link are transmitted successfully before the pre-scheduling resource is exhausted, the access RS need not feed back again. If some bursts of the MS are still not transmitted successfully after the pre-scheduling resource is exhausted, the access RS must apply resource to the MR-BS for retransmitting the failed bursts. This application may use an HARQ error report message defined by the IEEE802.16j standard in the existing technology.

Figure 5:
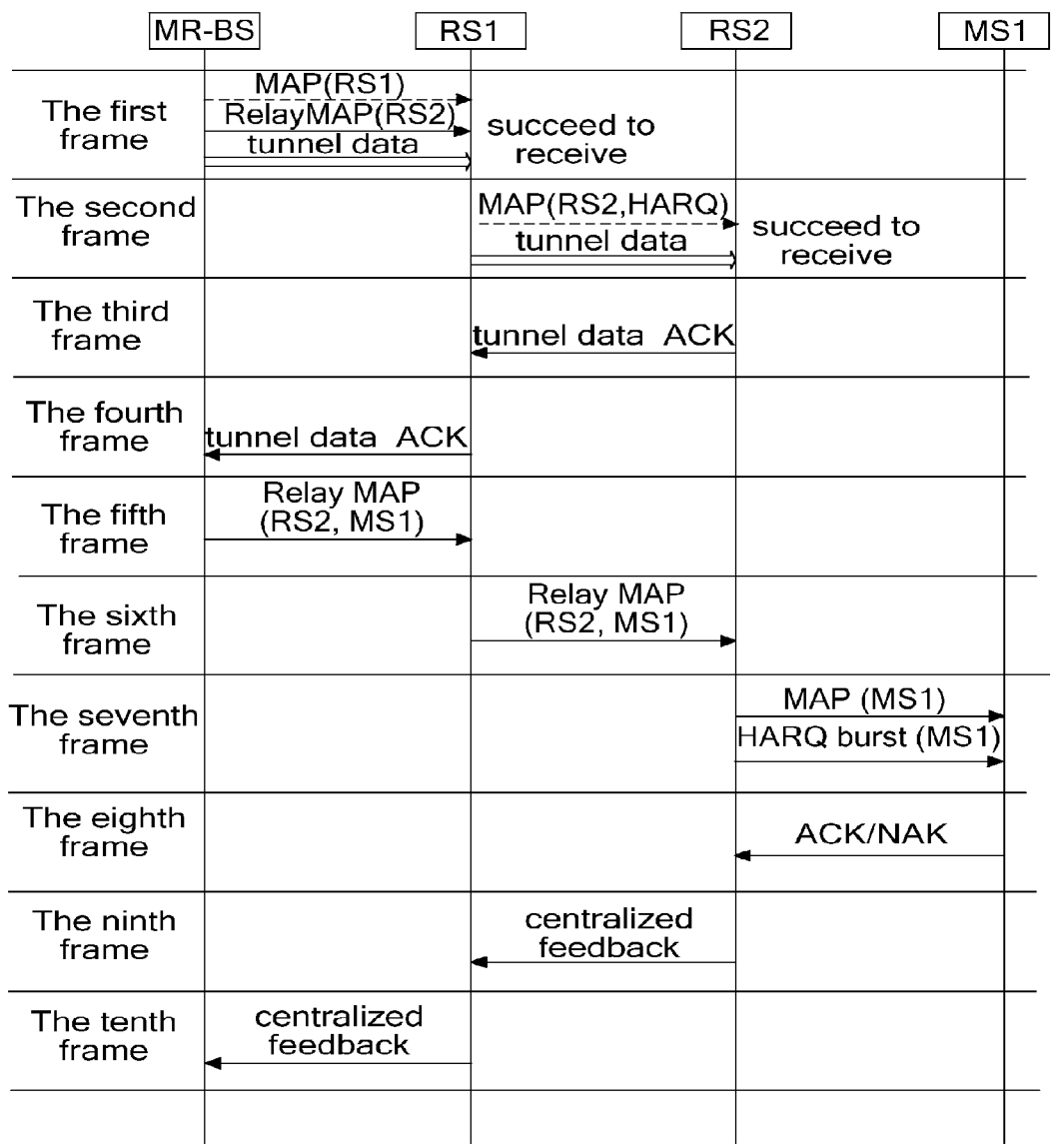
FIG. 5 is a schematic diagram of an HARQ on a downlink tunnel according to embodiments of the present invention.

The characteristic of the embodiment 2 is link-by-link transmission, and that feedback about the MS burst may be transmitted to the MR-BS. As shown in FIG. 5, the MS burst may begin to be transmitted only after the tunnel link data is transmitted successfully. ACKs/NAKs of all MSs are collected by the access RS, and then are fed back to the uplink RS concentratedly, and finally are transferred to the MR-BS. The MR-BS schedules the resource and arranges to retransmit the failed MS burst according to the received feedback.

Figure 7:
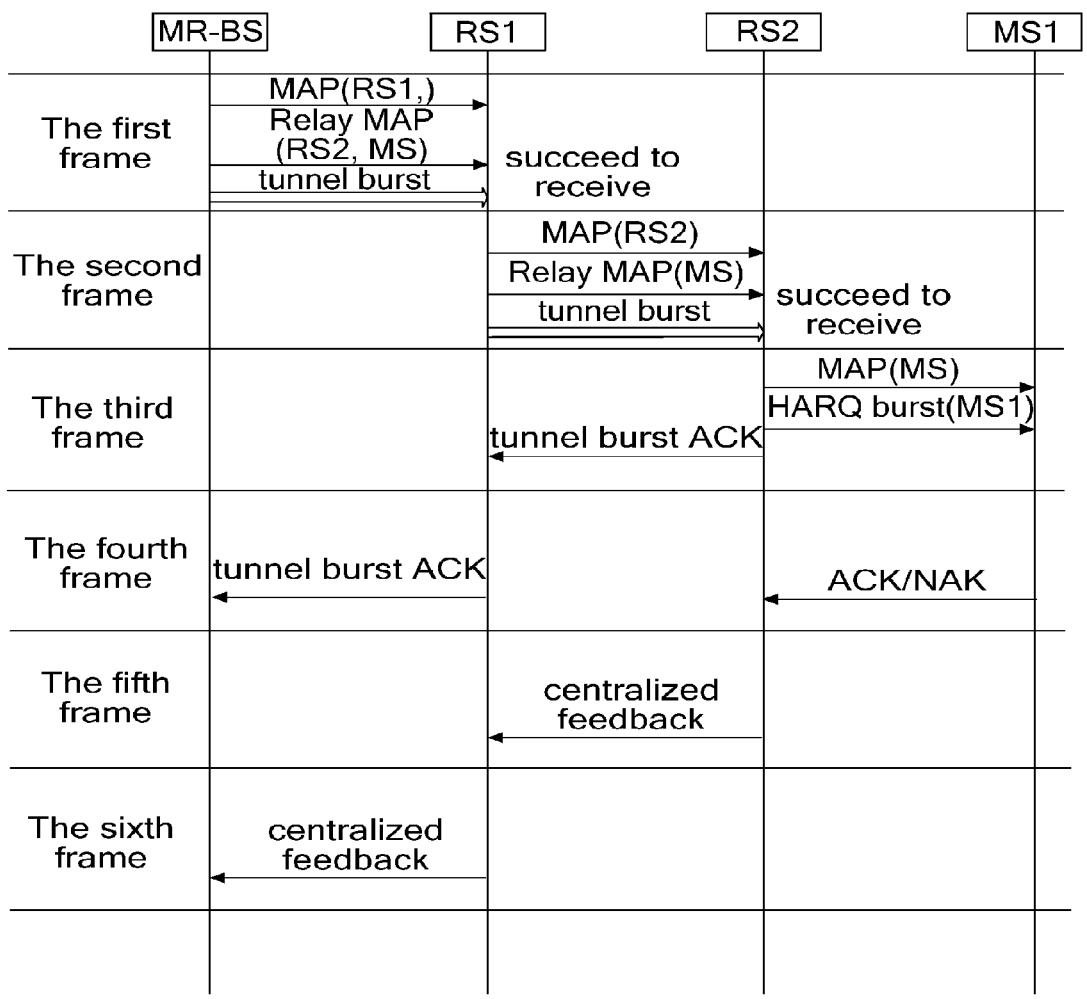
FIG. 7 is a schematic diagram of an HARQ on a downlink tunnel according to embodiments of the present invention.

The characteristic of the embodiment 3 is that feedback about the MS burst may be transmitted to the MR-BS and that the MR-BS may pre-arrange a transmission link from the MR-BS to the MS (as shown in FIG. 7). If the tunnel data is transmitted to the RS3 without retransmission and are received by the RS3 successfully, the MS burst in the tunnel data may be taken out by the RS3 immediately and be transmitted to the MS. But the cost is that pre-arranged resource will be wasted in case the tunnel data is not transmitted successfully.

Figure 6:
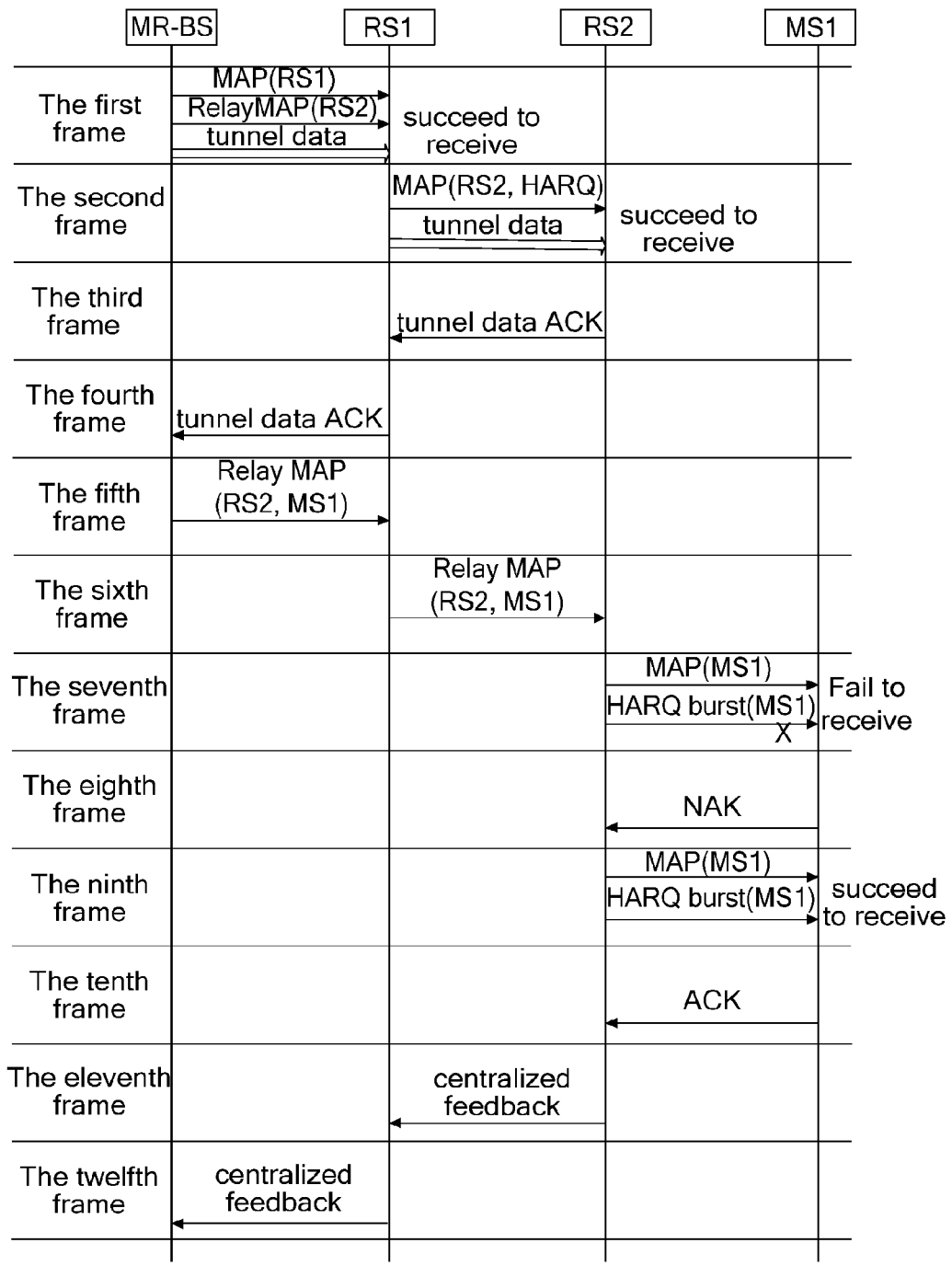
FIG. 6 is a schematic diagram of an HARQ on a downlink tunnel adopting pre-scheduling on one access link according to embodiments of the present invention.

For the embodiment 2 and embodiment 3, as shown in FIG. 6, in order to improve the retransmission efficiency, the MR-BS may pre-schedule appropriate air interface resource for retransmission on the access link according to the link information of the access link. In case the MS reports that the burst fails to be received on the access link, the retransmission may begin immediately on the pre-scheduled air interface resource without waiting the MR-BS to arrange new air interface resource. After the pre-scheduled resource is exhausted, the access RS must, after collecting every result of retransmission based on the pre-scheduled resource on the access link, report them upwards to the MR-BS no matter whether the retransmission is successful.

For the embodiment 2 and embodiment 3, the manner of reporting the centralized feedback may use, but is not limited to the following manners. The MR-BS may arrange one dedicated HARQ_ACKCH area for the access RS to report the centralized feedback. The sequence of the feedback in the area may be designated by the MR-BS according to the sequence of the connections or bursts, or may also adopt an encoding manner. An encoding manner of the centralized feedback is shown in FIG. 10, the feedback of three bursts in this figure may be encoded in one group, and is denoted by three tiles defined in the IEEE 802.16j standard. The combinations of different codes are orthogonal to each other, and denote different situations of MS burst transmission. For example, the feedback code A0 denotes that three bursts are all received correctly, and the feedback code A1 denotes that an error transmission of the first burst in low bits occurs on the access link while the other two bursts are received correctly.

For the embodiment 2 and embodiment 3, it is required to trigger the RS to transfer the centralized feedback when the centralized feedback is reported. But in the existing technology, the RS may be triggered only when it receives the data that is to be transferred. It is not defined in the existing technology regarding to how to trigger the RS to transfer the feedback when the burst is retransmitted on the access link but the RS fails to receive the data. In order to resolve the problem, specific methods may include, but is not limited to, the two methods as below.

Method One is using empty data to trigger. An empty burst, HARQ burst, is defined in FIG. 11, and the burst format of the empty burst, HARQ burst, is defined in FIG. 12.

The so-called empty data refer to the data without any data transmission. For the embodiment 2 and embodiment 3, there are several empty bursts in one empty data. The centralized feedback is the collection of the corresponding empty bursts. The RS which receives the empty data only calculates the delay for the feedback about transferring the empty data. A formula for calculating the delay is given as follows:

if the RS receives the empty data in the $i^{th}$ frame, the feedback should be given in the $(i+n)^{th}$ frame, wherein, n is determined by the formula (1).

$$n = H*p + (H+1)*j + s \qquad (2)$$

in the formula (2), H is the number of the hops between the RS and the end point of the link, p is the number of fixed delay frames of the RS, j is a feedback delay for the HARQ defined by the system and is provided in a system broadcast message; s is a delay for the access RS collecting feedback from all RSs.

Method Two is notifying the RS directly of the delay required for transferring the feedback. The notice mode of the feedback delay is defined in FIG. 13. The notice format of the feedback delay is defined in FIG. 14. The RS which receives the notice will wait for the corresponding time according to the delay information in the notice and then transfers the feedback from the designated connection directly.

The above descriptions are just embodiments of the present invention and are not used to limit the present invention, for those skilled in the art, various modifications and variations can be made to the present invention. Any modification, equivalent substitution or improvement, etc. within the spirit and principle of the present invention shall be included in the scope of claims of the present invention.

What is claimed is:

1. A hybrid automatic repeat request method of a downlink tunnel, comprising the following steps:
a base station transmitting tunnel data that comprise protocol data units of multiple mobile stations to an access relay station via a tunnel link;
(a) the access relay station determining its own reception of the tunnel data that comprise protocol data units of multiple mobile stations, and transmitting feedback to the base station via the tunnel link; or
(b) the access relay station receiving feedback from each of the mobile stations about reception of a corresponding protocol data unit which is sent via an access link, and according to the feedback from each of the mobile stations, applying for bandwidth for retransmission or concentratedly transmitting the feedback from each of the mobile stations to the base station via the tunnel link, wherein
the access relay station extracting the protocol data unit of each of the mobile stations after successfully receiving the tunnel data that comprise protocol data units of multiple mobile stations, and transmitting the protocol data unit of each of the mobile stations to each of the mobile stations via the access link,
the tunnel link being made up of multi-hop relay stations, the relay station accessing the base station being the $1^{st}$ hop relay station, and the relay station accessing the mobile station being the $n^{th}$ hop relay station, wherein, the $1^{st}$ hop, the $2^{nd}$ hop, . . . , the $(n-1)^{th}$ hop relay station not transmitting feedback immediately to the base station after receiving the tunnel data.

2. The method according to claim 1, wherein, the base station allocates corresponding channels for data transmission and feedback to each of the hop relay stations before transmitting the tunnel data.

3. The method according to claim 2, wherein, each of the hop relay stations knows the feedback channel allocated to it by the base station via its own calculation.

4. The method according to claim 3, wherein, when the $t^{th}$ hop relay station on the tunnel link fails to receive the tunnel data that comprise protocol data units of multiple mobile stations, the $t^{th}$ hop relay station transmits repeat request information to the base station via the $(t-1)^{th}$ hop, the $(t-2)^{th}$ hop, . . . , the $1^{st}$ hop relay station on the feedback channel which is allocated to it by the base station.

5. The method according to claim 4, wherein, if the $t^{th}$ relay station receives the tunnel data that comprise protocol data units of multiple mobile stations in the $i^{th}$ frame, then the $t^{th}$ relay station transmits feedback from a downlink relay station to the base station in the $(i+m)^{th}$ frame, wherein, m=M*q+ (M+1)*k, M is the number of hops between the $t^{th}$ hop relay station and the access relay station, q is the number of fixed delay frames of each of the hop relay stations for the tunnel data that comprise protocol data units of multiple mobile stations, k is a delay for hybrid automatic repeat request feedback for the tunnel data that comprise protocol data units of multiple mobile stations on each of the hop relay stations.

6. The method according to claim 5, wherein, if the access relay station receives the tunnel data that comprise protocol data units of multiple mobile stations successfully, then the access relay station transmits reception acknowledgement information to the base station immediately, otherwise encodes the repeat request information immediately, and transmits the encoded repeat request information to the base station.

7. The method according to claim 6, wherein, if the tunnel data that comprise protocol data units of multiple mobile stations is a tunnel burst, then the $t^{th}$ hop relay station determines whether it receives the protocol data unit of each of the mobile stations successfully according to a cyclic redundancy check code which is carried by the protocol data unit of each of the mobile stations itself.

8. The method according to claim 7, wherein, the encoded repeat request information includes information with respect to the $t^{th}$ hop relay station and information with respect to connections of which the protocol data units are not received successfully by the $t^{th}$ hop relay station.

9. The method according to claim 8, wherein, the access relay station retransmits the corresponding protocol data unit to the mobile station which fails to receive the corresponding protocol data unit via pre-scheduled air interface resource.

10. The method according to claim 9, wherein, when the pre-scheduled air interface resource is insufficient for retransmitting the corresponding protocol data unit to the mobile station which fails to receive the corresponding protocol data unit, the access relay station applies again to the base station for the air interface resource for retransmission.

11. The method according to claim 10, wherein, the access relay station transmits the feedback from the multiple mobile stations concentratedly to the base station via the tunnel link or a dedicated hybrid automatic repeat response link.

12. The method according to claim 6, wherein, if the tunnel data that comprise protocol data units of multiple mobile stations is a tunnel packet, then the $t^{th}$ hop relay station determines whether it receives the tunnel data that comprise protocol data units of multiple mobile stations successfully according to a cyclic redundancy check code of the tunnel data that comprise protocol data units of multiple mobile stations.

13. The method according to claim 12, wherein, the encoded repeat request information includes information with respect to the $t^{th}$ hop relay station.

14. The method according to claim 13, wherein, the access relay station retransmits the corresponding protocol data unit to the mobile station which fails to receive the corresponding protocol data unit via pre-scheduled air interface resource.

15. The method according to claim 14, wherein, when the pre-scheduled air interface resource is insufficient for retransmitting the corresponding protocol data unit to the mobile station which fails to receive the corresponding protocol data unit, the access relay station applies again to the base station for the air interface resource for retransmission.

16. The method according to claim 15, wherein, the access relay station transmits the feedback from the multiple mobile stations to the base station via the tunnel link or a special hybrid automatic repeat response link.

17. The method according to claim 4, wherein, the $t^{th}$ relay station encodes the repeat request information, and transmits encoded repeat request information to the base station via the feedback channel which is allocated to it by the base station.

18. The method according to claim 17, wherein, if the access relay station receives the tunnel data that comprise protocol data units of multiple mobile stations successfully, then the access relay station transmits reception acknowledgement information to the base station immediately, otherwise encodes the repeat request information immediately, and transmits the encoded repeat request information to the base station.

19. The method according to claim 18, wherein, if the tunnel data that comprise protocol data units of multiple mobile stations is a tunnel burst, then the tth hop relay station determines whether it receives the protocol data unit of each of the mobile stations successfully according to a cyclic redundancy check code which is carried by the protocol data unit of each of the mobile stations itself.

20. The method according to claim 19, wherein, the encoded repeat request information includes information with respect to the $t^{th}$ hop relay station and information with respect to connections of which the protocol data units are not received successfully by the $t^{th}$ hop relay station.

21. The method according to claim 20, wherein, the access relay station retransmits the corresponding protocol data unit to the mobile station which fails to receive the corresponding protocol data unit via pre-scheduled air interface resource.

22. The method according to claim 21, wherein, when the pre-scheduled air interface resource is insufficient for retransmitting the corresponding protocol data unit to the mobile station which fails to receive the corresponding protocol data unit, the access relay station applies again to the base station for the air interface resource for retransmission.

23. The method according to claim 22, wherein, the access relay station transmits the feedback from the multiple mobile stations concentratedly to the base station via the tunnel link or a dedicated hybrid automatic repeat response link.

24. The method according to claim 18, wherein, if the tunnel data that comprise protocol data units of multiple mobile stations is a tunnel packet, then the $t^{th}$ hop relay station determines whether it receives the tunnel data that comprise protocol data units of multiple mobile stations successfully according to a cyclic redundancy check code of the tunnel data that comprise protocol data units of multiple mobile stations.

25. The method according to claim 24, wherein, the encoded repeat request information includes information with respect to the $t^{th}$ hop relay station.

26. The method according to claim 25, wherein, the access relay station retransmits the corresponding protocol data unit to the mobile station which fails to receive the corresponding protocol data unit via pre-scheduled air interface resource.

27. The method according to claim 26, wherein, when the pre-scheduled air interface resource is insufficient for retransmitting the corresponding protocol data unit to the mobile station which fails to receive the corresponding protocol data unit, the access relay station applies again to the base station for the air interface resource for retransmission.

28. The method according to claim 27, wherein, the access relay station transmits the feedback from the multiple mobile stations to the base station via the tunnel link or a special hybrid automatic repeat response link.

* * * * *